(12) United States Patent
Kang (10) Patent No.: US 8,982,305 B2
(45) Date of Patent: Mar. 17, 2015

(54) LIQUID CRYSTAL DISPLAY PANEL AND DISPLAY APPARATUS USING THE SAME

(75) Inventor: Chihtsung Kang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 148 days.

(21) Appl. No.: 13/697,750

(22) PCT Filed: Jun. 7, 2012

(86) PCT No.: PCT/CN2012/076603
§ 371 (c)(1),
(2), (4) Date: Nov. 13, 2012

(87) PCT Pub. No.: WO2013/174040
PCT Pub. Date: Nov. 28, 2013

(65) Prior Publication Data
US 2013/0314640 A1    Nov. 28, 2013

(30) Foreign Application Priority Data
May 24, 2012   (CN) .......................... 2012 1 0163425

(51) Int. Cl.
G02F 1/1335    (2006.01)
G02F 1/1337    (2006.01)
G02F 1/1343    (2006.01)
G02F 1/13363   (2006.01)

(52) U.S. Cl.
CPC ........ *G02F 1/1337* (2013.01); *G02F 1/133611* (2013.01); *G02F 1/13363* (2013.01); *G02F 1/133707* (2013.01); *G02F 1/134309* (2013.01); *G02F 1/133753* (2013.01); *G02F 2001/133638* (2013.01)
USPC ............ 349/129; 349/130; 349/141; 349/117

(58) Field of Classification Search
USPC .................................................. 349/129, 130
See application file for complete search history.

(56) References Cited

U.S. PATENT DOCUMENTS

| | | | | |
|---|---|---|---|---|
| 6,735,017 | B1 * | 5/2004 | Acosta et al. ............ | 359/489.07 |
| 7,589,813 | B2 * | 9/2009 | Chen et al. .................... | 349/129 |
| 8,179,507 | B2 * | 5/2012 | Park et al. ..................... | 349/114 |
| 2008/0316597 | A1 * | 12/2008 | Tsai et al. ..................... | 359/465 |
| 2010/0157232 | A1 * | 6/2010 | Kim et al. ..................... | 349/144 |

* cited by examiner

*Primary Examiner* — Dennis Y Kim
(74) *Attorney, Agent, or Firm* — Kirton McConkie; Evan R. Witt (57) ABSTRACT

The present invention provides a liquid crystal display (LCD) panel and a display apparatus using the same. In the LCD panel, a second electrode of the second substrate comprises a trunk portion and a plurality of branch portion, and each of the pixels comprises a main pixel region and a sub-pixel region, and an included angle between the trunk portion and the branch portions is of 45 degrees in the main pixel region, and in each of the sub-pixel regions, a predetermined angle between the trunk portion and the branch portions is not equal to 45 degrees. The λ/2 pattern retarder film of the LCD panel comprises λ/2 retarder rows and zero wave retarder rows.

19 Claims, 8 Drawing Sheets

LIQUID CRYSTAL DISPLAY PANEL AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between.

At present, a vertical alignment (VA) technology has been developed for LCD panels. For example, a polymer stabilized vertical alignment (PSVA) type liquid crystal display panel which is made using a polymer-stabilized alignment (PSA) process, can have some advantages, such as wide viewing angle, high aperture ratio, high contrast and simple process.

In the PSVA type LCD, reactive monomers can be doped in the liquid crystal between the two transparent substrates and mixed with liquid crystal molecules, wherein the polyimide (PI) is coated on the surface of each of the transparent substrates to be an alignment layer. Subsequently, when applying a voltage and irradiating an ultraviolet (UV) light to the two transparent substrates, a phase separation arises in the reactive monomers and the liquid crystal molecules, and a polymer is formed on the alignment layer of the transparent substrate. The liquid crystal molecules are oriented along a direction of the polymer due to the interaction between the polymer and the liquid crystal molecules. Therefore, the liquid crystal molecules between the transparent substrates can have a pre-tilt angle.

However, currently, a color shift problem is likely to occur in the VA type LCD, hence deteriorating the display quality of the LCD. For improving the above-mentioned color shift problem, a pixel structure of the LCD panel may be varied, but the variation of the pixel structure may result in a reduction of a transmittance of the LCD panel.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the color shift problem and the transmittance problem existing in the conventional VA type LCD.

A primary object of the present invention is to provide a liquid crystal display panel, and the liquid crystal display panel comprises: a first substrate comprising a first electrode; a second substrate comprising a second electrode, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is of 45 degrees in the main pixel region, and the sub-pixel regions comprise first sub-pixel regions and second sub-pixel regions, and in each of the sub-pixel regions, a predetermined angle between the trunk portion and the branch portions is less or greater than 45 degrees, and the predetermined angle is different in the first sub-pixel regions and the second sub-pixel regions, respectively; a liquid crystal layer formed between the first substrate and the second substrate, and the liquid crystal layer comprises reactive monomers liquid crystal molecules; a first polarizer disposed at an outer side of the first substrate; a second polarizer disposed at an outer side of the second substrate; and a half wave ($\lambda/2$) pattern retarder film bonded on an outer surface of the first substrate or the second substrate, wherein the $\lambda/2$ pattern retarder film comprises a plurality of $\lambda/2$ retarder rows and a plurality of zero wave retarder rows, and the zero wave retarder rows are positioned to the main pixel regions, and the $\lambda/2$ retarder rows are positioned to the sub-pixel regions.

In one embodiment of the present invention, the sub-pixel regions further comprise third sub-pixel regions, and the predetermined angle in the third sub-pixel regions is different to the predetermined angles in the first sub-pixel regions and the second sub-pixel regions.

In one embodiment of the present invention, the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

In one embodiment of the present invention, the $\lambda/2$ pattern retarder film is positioned between the second substrate and the second polarizer.

In one embodiment of the present invention, the predetermined angle ($\theta_2$) is less than 45 degrees, and there is an included angle ($\psi_1$) between slow axes of the $\lambda/2$ pattern retarder film and absorption axis of the second polarizer, and the predetermined angle ($\theta_2$) and the included angle ($\psi_1$) satisfy the below equations: $\psi_1+\theta_2=45°$; and $90-\theta_2>2\psi_1$.

In one embodiment of the present invention, the $\lambda/2$ pattern retarder film is positioned between the first substrate and the first polarizer.

In one embodiment of the present invention, the predetermined angle ($\theta_2$) is greater than 45 degrees, and there is an included angle ($\psi_2$) between slow axes of the $\lambda/2$ pattern retarder film and absorption axis of the first polarizer, and the predetermined angle ($\theta_2$) and the included angle ($\psi_1$) satisfy the below equations: $\psi_2+\theta_2=135°$; and $2(90-\theta_2)>\psi_2$.

Another object of the present invention is to provide a liquid crystal display panel, and the liquid crystal display panel comprises: a first substrate comprising a first electrode; a second substrate comprising a second electrode and a plurality of pixels, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is of 45 degrees in the main pixel region, and in each of the sub-pixel regions, a predetermined angle between the trunk portion and the branch portions is less or greater than 45 degrees; a liquid crystal layer formed between the first substrate and the second substrate; a first polarizer disposed at an outer side of the first substrate; a second polarizer disposed at an outer side of the second substrate; and a $\lambda/2$ pattern retarder film bonded on an outer surface of the first substrate or the second substrate, wherein the $\lambda/2$ pattern retarder film comprises a plurality of $\lambda/2$ retarder rows and a plurality of zero wave retarder rows are positioned to the main pixel regions, and the $\lambda/2$ retarder rows are positioned to the sub-pixel regions.

In one embodiment of the present invention, the sub-pixel regions comprise first sub-pixel regions and second sub-pixel regions, and the predetermined angle is different in the first sub-pixel regions and the second sub-pixel regions, respectively.

In one embodiment of the present invention, the sub-pixel regions further comprise third sub-pixel regions, and the predetermined angle in the third sub-pixel regions is different to the predetermined angles in the first sub-pixel regions and the second sub-pixel regions.

In one embodiment of the present invention, the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

In one embodiment of the present invention, the λ/2 pattern retarder film is positioned between the second substrate and the second polarizer.

In one embodiment of the present invention, the predetermined angle ($\theta_2$) is less than 45 degrees, and there is an included angle ($\psi_1$) between slow axes of the λ/2 pattern retarder film and absorption axis of the second polarizer, and the predetermined angle ($\theta_2$) and the included angle ($\psi_1$) satisfy the below equations: $\psi_1+\theta_2=45°$; and $90-\theta_2>2\psi_1$.

In one embodiment of the present invention, the λ/2 pattern retarder film is positioned between the first substrate and the first polarizer.

In one embodiment of the present invention, the predetermined angle ($\theta_2$) is greater than 45 degrees, and there is an included angle ($\psi_2$) between slow axes of the λ/2 pattern retarder film and absorption axis of the first polarizer, and the predetermined angle ($\theta_2$) and the included angle ($\psi_1$) satisfy the below equations: $\psi_2+\theta_2=135°$; and $2(90-\theta_2)>\psi_2$.

A further object of the present invention is to provide a display apparatus comprising a backlight module and a liquid crystal display panel. The liquid crystal display panel comprises: a first substrate comprising a first electrode; a second substrate comprising a second electrode and a plurality of pixels, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is of 45 degrees in the main pixel region, and in each of the sub-pixel regions, a predetermined angle between the trunk portion and the branch portions is less or greater than 45 degrees; a liquid crystal layer formed between the first substrate and the second substrate; a first polarizer disposed at an outer side of the first substrate; a second polarizer disposed at an outer side of the second substrate; and a λ/2 pattern retarder film bonded on an outer surface of the first substrate or the second substrate, wherein the λ/2 pattern retarder film comprises a plurality of λ/2 retarder rows and a plurality of zero wave retarder rows, and the zero wave retarder rows are positioned to the main pixel regions, and the λ/2 retarder rows are positioned to the sub-pixel regions.

In one embodiment of the present invention, the sub-pixel regions comprise first sub-pixel regions and second sub-pixel regions, and the predetermined angle is different in the first sub-pixel regions and the second sub-pixel regions, respectively.

In one embodiment of the present invention, the sub-pixel regions further comprise third sub-pixel regions, and the predetermined angle in the third sub-pixel regions is different to the predetermined angles in the first sub-pixel regions and the second sub-pixel regions.

In one embodiment of the present invention, the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

In one embodiment of the present invention, the λ/2 pattern retarder film is positioned between the second substrate and the second polarizer.

In one embodiment of the present invention, the predetermined angle ($\theta_2$) is less than 45 degrees, and there is an included angle ($\psi_1$) between slow axes of the λ/2 pattern retarder film and absorption axis of the second polarizer, and the predetermined angle ($\theta_2$) and the included angle ($\psi_1$) satisfy the below equations: $\psi_1+\theta_2=45°$; and $90-\theta_2>2\psi_1$.

In one embodiment of the present invention, the λ/2 pattern retarder film is positioned between the first substrate and the first polarizer.

In one embodiment of the present invention, the predetermined angle ($\theta_2$) is greater than 45 degrees, and there is an included angle ($\psi_2$) between slow axes of the λ/2 pattern retarder film and absorption axis of the first polarizer, and the predetermined angle ($\theta_2$) and the included angle ($\psi_1$) satisfy the below equations: $\psi_2+\theta_2=135°$; and $2(90-\theta_2)>\psi_2$.

In the LCD panel and the display apparatus using the same of the present invention, with the use of the pixel electrode structure, the color shift problem of the VA type LCD apparatus can be improved. Moreover, the polarized direction and angles of the light rays can be adjusted by the λ/2 pattern retarder film for enhancing the transmittance of the liquid crystal display panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 1:
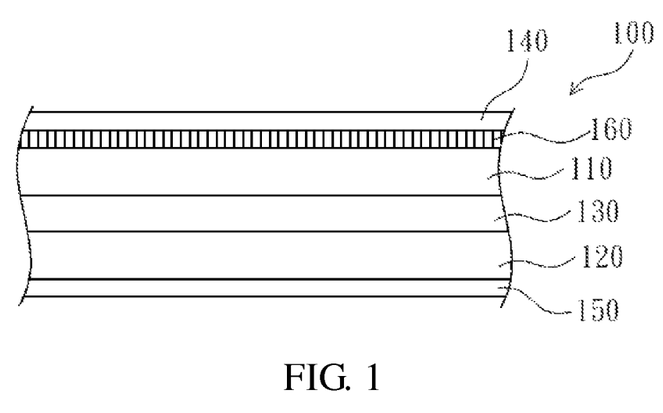
FIG. 1 is a cross-sectional view showing a liquid crystal display panel according to one embodiment of the present invention.

Referring to FIG. 1, a cross-sectional view showing a liquid crystal display (LCD) panel according to one embodiment of the present invention is illustrated. The display apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light. The liquid crystal display panel 100 may be a VA type liquid crystal display panel, such as a PSVA type liquid crystal display panel or a pattern vertical alignment (PVA) type liquid crystal display panel.

Referring to FIG. 1 again, the liquid crystal display panel 100 may comprise a first substrate 110, a second substrate 120, a liquid crystal layer 130, a first polarizer 140 and a second polarizer 150 and a half wave (λ/2) pattern retarder film 160. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. The λ/2 pattern retarder film 160 is bonded on an outer surface of the first substrate 110 or the second substrate 120

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 2:
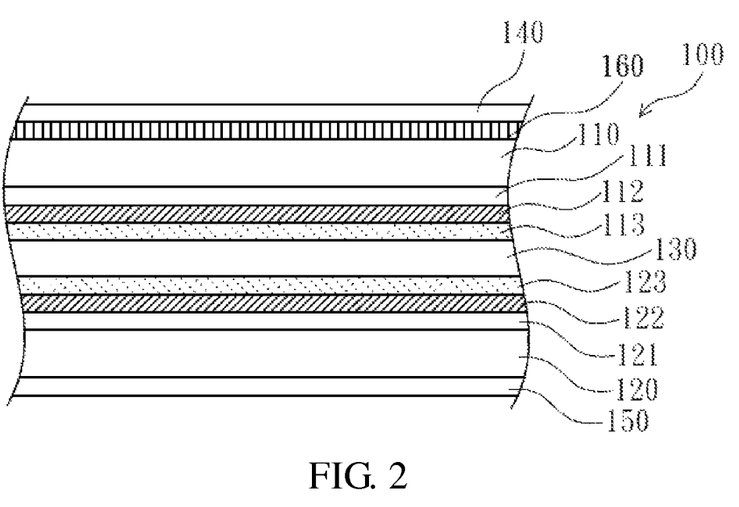
FIG. 2 is a cross-sectional view showing a PSVA type liquid crystal display panel according to one embodiment of the present invention.

Referring to FIG. 2, a cross-sectional view showing a PSVA type liquid crystal display panel according to one embodiment of the present invention is illustrated. In this embodiment, the liquid crystal display panel 100 may be, for example, a PSVA type liquid crystal display panel. At this time, the liquid crystal layer 130 can include reactive monomers and liquid crystal molecules. The reactive monomers are preferably photo-sensitive monomers mixed with the liquid crystal molecules. The first polarizer 140 is disposed on one side of the first substrate 110 and opposite to the liquid crystal layer 130 (i.e. a light-emitting side of the first substrate 110). The second polarizer 150 is disposed on one side of the second substrate 120 and opposite to the liquid crystal layer 130 (i.e. a light-incident side of the second substrate 120).

Referring to FIG. 2 again, when the liquid crystal display panel 100 is the PSVA type liquid crystal display panel, the first substrate 110 can comprise a first electrode 111, a first alignment layer 112 and a first polymer alignment layer 113, and the second substrate 120 can comprise a second electrode 121, a second alignment layer 122 and a second polymer alignment layer 123. The first alignment layer 112 and the first polymer alignment layer 113 are formed on the first electrode 111 in sequence. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules of the liquid crystal layer 130 by the first electrode 111 and the second electrode 121. In this embodiment, the first electrode 111 may be a common electrode, and the second electrode 121 may be a pixel electrode. In addition, the second electrode 121 can have a plurality of regions, and the voltage applied to each of the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tilt angle, wherein the pre-tilt angle is less than 90 degrees, preferably less than 60 degrees. The alignment layers 112, 122 are formed on the substrates 110, 120, respectively. The polymer alignment layers 113, 123 are polymerized of the reactive monomers bonded with the alignment layers 112, 122.

Figure 3:
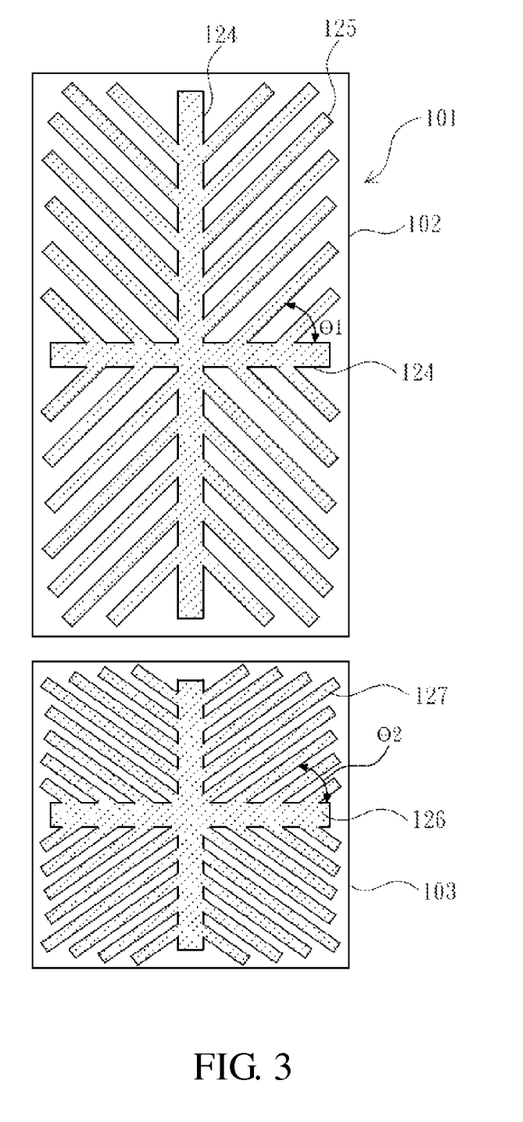
FIG. 3 is a schematic diagram showing a pixel electrode structure of the liquid crystal display panel according to one embodiment of the present invention.
Figure 4:
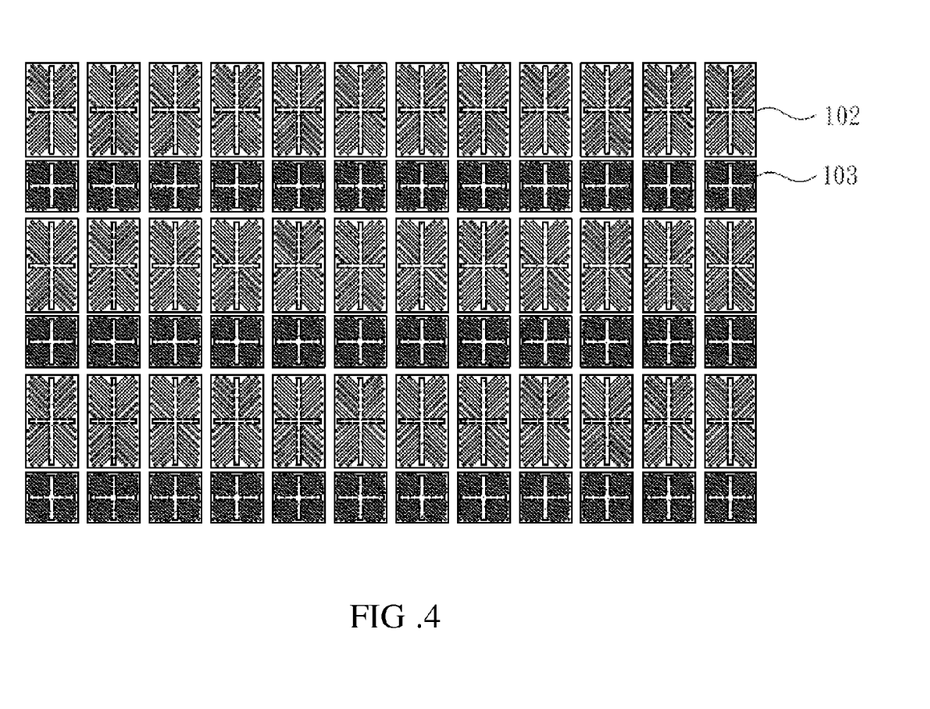
FIG. 4 is a schematic diagram showing main pixel regions and sub-pixel regions of the liquid crystal display panel according to one embodiment of the present invention.

Referring to FIG. 3 and FIG. 4, FIG. 3 is a schematic diagram showing a pixel electrode structure of the liquid crystal display panel according to one embodiment of the present invention, and FIG. 4 is a schematic diagram showing main pixel regions and sub-pixel regions of the liquid crystal display panel according to one embodiment of the present invention. The second substrate 120 comprises a plurality of signal lines (not shown), such as gate lines and data lines, which are crisscrossed to each other, and thereby form a plurality of pixel regions 101 arranged in a matrix manner. In each of the pixel regions 101, the second electrode 121 has a main pixel region 102 and a sub-pixel region 103, wherein an area of the main pixel region 102 is preferably larger than an area of the sub-pixel region 103. A pixel electrode structure in each of the main pixel region 102 comprises a first trunk portion 124 and a plurality of first branch portions 125. A pixel electrode structure in each of the sub-pixel region 103 comprises a second trunk portion 126 and a plurality of second branch portions 127. The first trunk portion 124 and the second trunk portion 126 may be crisscross patterns, and each of the main pixel regions 102 and the sub-pixel regions 103 is divided into four pixel region units by the trunk portions 124 and 126. The branch portions 125 and 127 obliquely extend from the trunk portions 124, 126, and are arranged parallel to each other. In this case, an includes angle $\theta_1$ between the first trunk portion 124 and the first branch portions 125 in the main pixel regions 102 is equal to 45 degrees for enhancing the transmittance of the liquid crystal display panel 100. A predetermined angle $\theta_2$ between the second trunk portion 126 and the second branch portions 127 in the sub-pixel regions 103 is less than or greater than 45 degrees, i.e. not equal to 45 degrees ($\theta \neq 45°$) for improving the color shift problem exiting in the VA type LCD apparatus.

In this case, the predetermined angle $\theta_2$ may be in the range of 10 degrees to 80 degrees except 45 degrees, for example in the range of 35 degrees to 55 degrees except 45 degrees (such as 55 or 40 degrees). Moreover, the sub-pixel regions 103 are preferably positioned at one side of the main pixel regions 102, and the main pixel regions 102 are alternately arranged with the sub-pixel regions 103 on the second substrate 120. In the present invention, with the predetermined angle $\theta_2$ which is not equal to 45 degrees in the sub-pixel regions 103, the color shift problem exiting in the VA type LCD can be mitigated.

Figure 5:
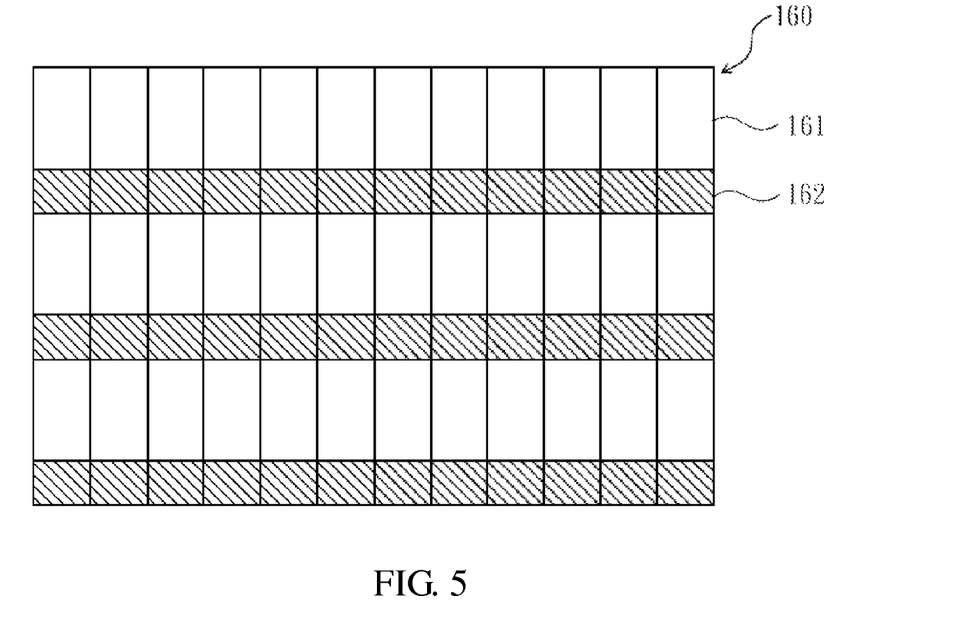
FIG. 5 is a schematic diagram showing the λ/4 pattern retarder film of the liquid crystal display panel according to one embodiment of the present invention.
Figure 6:
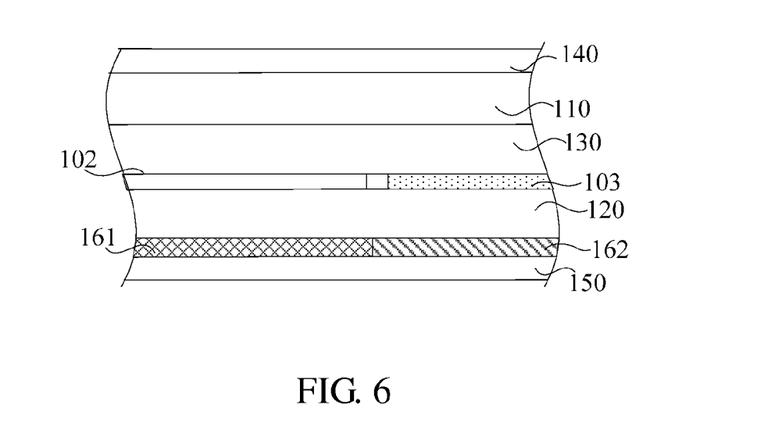
FIG. 6 is a partially cross-sectional view showing the liquid crystal display panel according to one embodiment of the present invention.

Referring to FIG. 5 and FIG. 6, FIG. 5 is a schematic diagram showing the λ/4 pattern retarder film of the liquid crystal display panel according to one embodiment of the present invention, and FIG. 6 is a partially cross-sectional view showing the liquid crystal display panel according to one embodiment of the present invention. The λ/2 pattern retarder film 160 comprises a plurality of zero wave retarder rows 161 and a plurality of λ/2 retarder rows 162. The zero wave retarder rows 161 and the λ/2 retarder rows 162 are arranged in an alternating manner. The zero wave retarder rows 161 are positioned to the main pixel regions 102, and the λ/2 retarder rows 162 are positioned to the sub-pixel regions 103. In this case, a width of the zero wave retarder rows 161 is about the same or similar to a width of the main pixel regions 102, and a width of the λ/2 retarder rows 162 is about the same or similar to a width of the sub-pixel regions 103. Therefore, the light rays passing through the main pixel regions 102 can correspondingly pass through the zero wave retarder rows 161, and the light rays passing through the sub-pixel regions 103 can correspondingly pass through the λ/2 retarder rows 162.

According to an optical theory, when an angle between a tilting direction of the liquid crystal molecules and an absorption axis of the polarizer is 45 degrees, the liquid crystal display panel can have a greatest transmittance. Therefore, in embodiments of the present invention, the transmittance of the liquid crystal display panel 100 can be enhanced by adjusting the tilting direction of the liquid crystal molecules and absorption axes of the polarizers 140, 150.

In the main pixel regions 102, the light rays pass through the zero wave retarder rows 161 of the λ/2 pattern retarder film 160, and thus the polarized state of the light rays are not affected by the λ/2 pattern retarder film 160.

Figure 7:
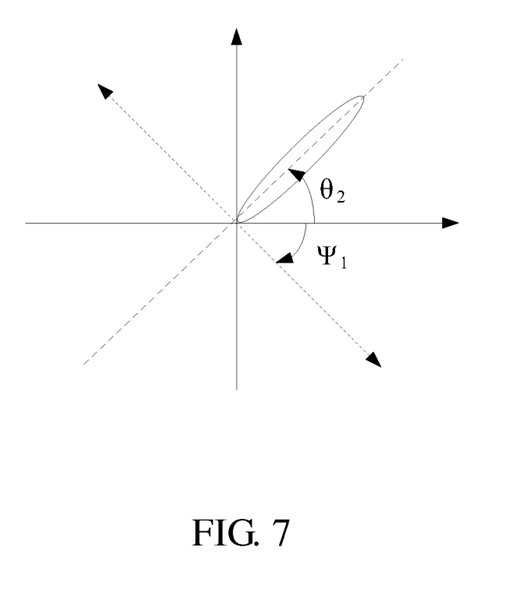
FIG. 7 is a schematic diagram showing different angles according to one embodiment of the present invention.

Referring to FIG. 7, a schematic diagram showing different angles according to one embodiment of the present invention is illustrated. When the λ/2 pattern retarder film is bonded on the outer surface of the second substrate 120, the λ/2 pattern retarder film is positioned between the second substrate 120 and the second polarizer 150. The absorption axis of the first polarizer 140 is vertical to the absorption axis of the second polarizer 150. That is, an included angle between the absorption axes of the first polarizer 140 and the second polarizer 150 is 90 degrees. In this case, there is an included angle $\psi_1$ between slow axes (C axis) of the λ/2 retarder rows 162 of the λ/2 pattern retarder film 160 and the absorption axis of the second polarizer 150, wherein the predetermined angle $\theta_2$ is less than 45 degrees, and the predetermined angle $\theta_2$ and the included angle $\psi_1$ satisfy the below equations (1) and (2):

$$\psi_1 + \theta_2 = 45° \tag{1}$$

$$90 - \theta_2 > 2\psi_1 \tag{2}$$

Figure 8:
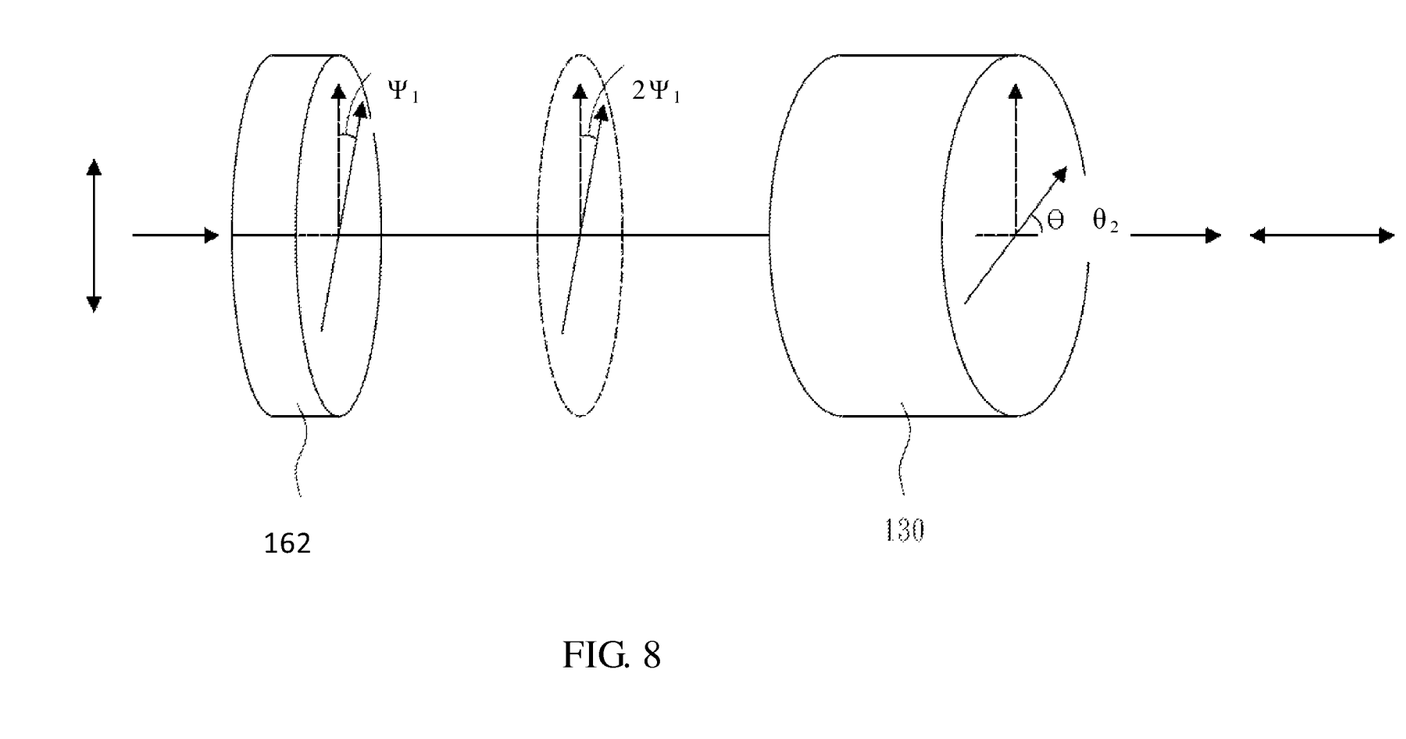
FIG. 8 is a schematic diagram showing polarized light rays according to one embodiment of the present invention.

Referring to FIG. 8, a schematic diagram showing polarized light rays according to one embodiment of the present invention is illustrated. Referring to the liquid crystal display panel 100 shown in FIG. 5, when the light rays are emitted from the second polarizer 150 to the first polarizer 140 of the liquid crystal display panel 100, in the sub-pixel regions 103, longitudinally and linearly polarized light rays from the second polarizer 150 are transformed into another kind of linearly polarized light rays in different directions by the λ/2 retarder rows 162 of the λ/2 pattern retarder film 160, and there is an included angle of $2\psi_1$ between the longitudinally and linearly polarized light rays and the transformed and polarized light rays. Subsequently, the transformed and polarized light rays are further transformed into transversely and linearly polarized light rays by the liquid crystal layer 130 (i.e. a liquid crystal cell), such that the linearly polarized light rays can pass through the transmission axis of the first polarizer 140. At this time, the liquid crystal layer 130 can be equivalent to a λ/2 retarder film. Therefore, in the sub-pixel regions 103, the polarized direction and angles of the light rays can be adjusted by the λ/2 retarder rows 162 of the λ/2 pattern retarder film 160 for enhancing the transmittance of the liquid crystal display panel 100.

Figure 9:
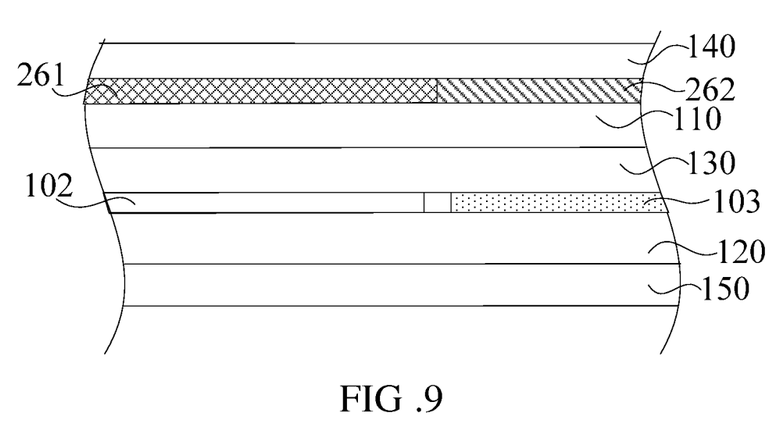
FIG. 9 is a schematic diagram showing main-pixel regions and sub-pixel regions according to another embodiment of the present invention.
Figure 10:
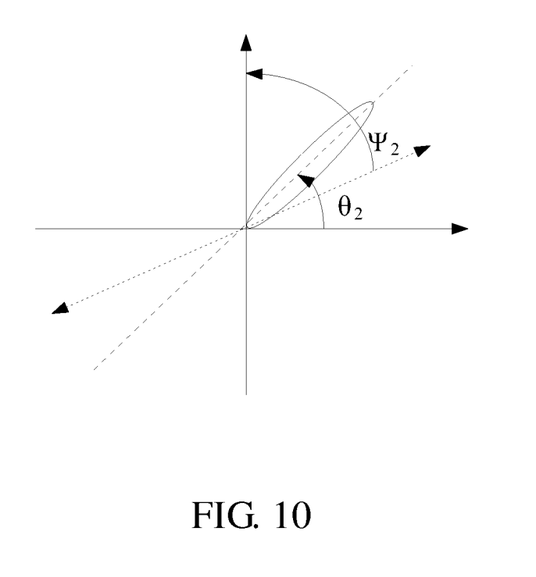
FIG. 10 is a schematic diagram showing different angles according to another embodiment of the present invention.

Referring to FIG. 9 and FIG. 10, FIG. 9 is a schematic diagram showing main-pixel regions and sub-pixel regions according to another embodiment of the present invention, and FIG. 10 is a schematic diagram showing different angles according to another embodiment of the present invention. The zero wave retarder rows 261 are positioned to the main pixel regions 102, and the λ/2 retarder rows 262 are positioned to the sub-pixel regions 103. When the λ/2 pattern retarder film is bonded on the outer surface of the first substrate 110, the λ/2 pattern retarder film is positioned between the first substrate 110 and the first polarizer 140. The absorption axis of the first polarizer 140 is vertical to the absorption axis of the second polarizer 150. That is, an included angle between the absorption axes of the first polarizer 140 and the second polarizer 150 is 90 degrees. In this case, there is an included angle $\psi_2$ between slow axes (C axis) of the λ/2 retarder rows 262 and the absorption axis of the first polarizer 140, wherein the predetermined angle $\theta_2$ and the included angle $\psi_2$ are greater than 45 degrees and satisfy the below equations (3) and (4):

$$\psi_2 + \theta_2 = 135° \tag{3}$$

$$2(90 - \theta_2) > \psi_2 \tag{4}$$

Figure 11:
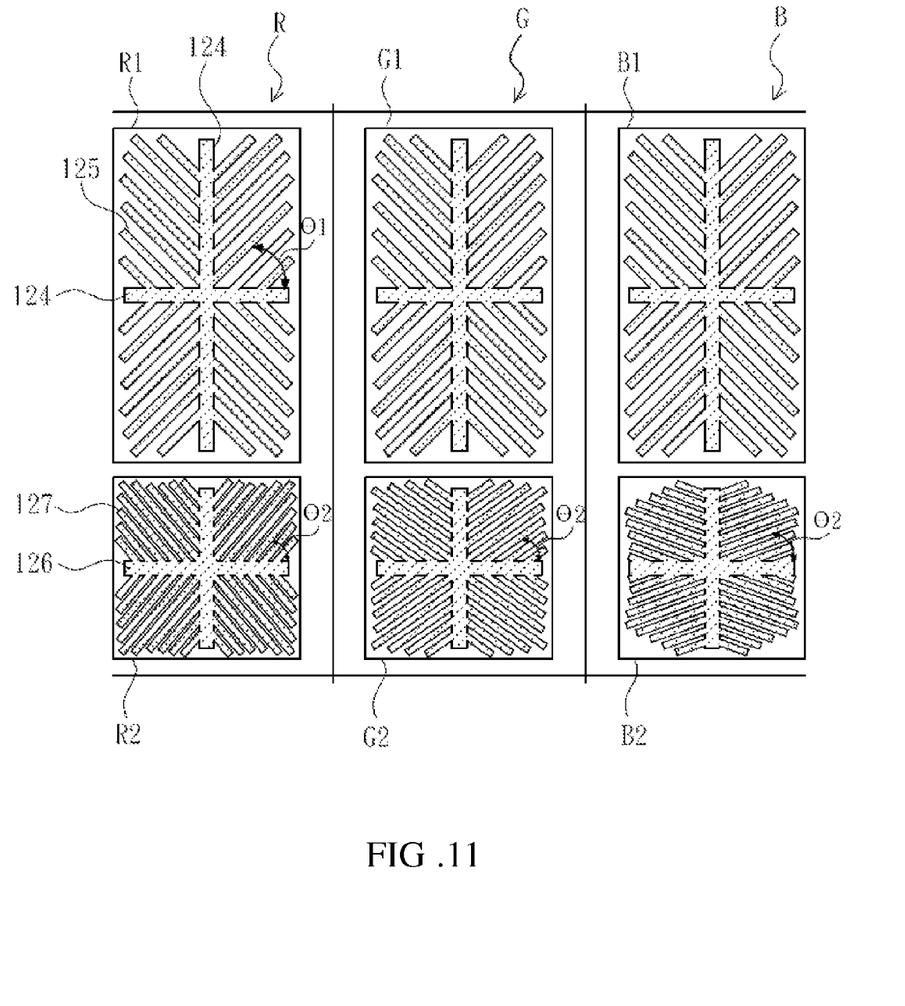
FIG. 11 is a schematic diagram showing pixel regions of a liquid crystal display panel according to still another embodiment of the present invention.

Referring to FIG. 11, a schematic diagram showing pixel regions of a liquid crystal display panel according to still another embodiment of the present invention is illustrated. In still another embodiment, the pixel regions of the second substrate 120 comprise a plurality of pixel regions R, G, B corresponding to different color filters. For example, the pixel region R has a main pixel region R1 and a sub-pixel region R2, and the pixel region G has a main pixel region G1 and a sub-pixel region G2, and the pixel region B has a main pixel region B1 and a sub-pixel region B2. At this time, the angles θ1 between the first trunk portion 124 and the first branch portions 125 in the main pixel regions R1, G1, B1 of the pixel regions R, G, B are the same and about equal to 45 degrees, and the predetermined angles θ2 between the second trunk portion 126 and the second branch portions 127 in the sub-pixel regions R2, G2, B2 can be different to each other, so as to further improve the color shift problem.

For example, the predetermined angle θ2 in first sub-pixel regions R2 may be of 46 degrees, and the predetermined angle θ2 in the second sub-pixel regions G2 may be of 47 degrees, and the predetermined angle θ2 in the third sub-pixel regions B2 may be of 48 degrees. In this case, the λ/2 retarder rows 162 of the λ/2 pattern retarder film 160 can be positioned to the sub-pixel regions R2, G2, B2, respectively, for enhancing the transmittance thereof.

In a further embodiment, the second substrate 120 further comprises pixel regions corresponding to yellow (Y) color filters and having main-pixel regions and fourth sub-pixel regions. The predetermined angle $\theta_2$ between the second trunk portion 126 and the second branch portions 127 in the first, second, third, and fourth sub-pixel regions can be different. In one embodiment, the liquid crystal display panel may be, for example, a PVA type liquid crystal display panel. At this time, in the liquid crystal display panel, the polymer alignment layers may be omitted.

As described above, in the LCD panel and the display apparatus of the present invention using the same, with the use of the pixel electrode structure, the color shift problem of the VA type LCD apparatus can be mitigated. Moreover, the polarized direction and angles of the light rays can be adjusted by the λ/2 pattern retarder film for enhancing the transmittance of the liquid crystal display panel. Therefore, in the LCD panel and the display apparatus of the present invention using the same, the color shift problem of the LCD panel can be improved, and the transmittance thereof can be enhanced.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel comprising:
   a first substrate comprising a first electrode;
   a second substrate comprising a second electrode and a plurality of pixels, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is 45 degrees in the main pixel region, and the sub-pixel regions comprise first sub-pixel regions and second sub-pixel regions, and in each of the sub-pixel regions, a predetermined angle between the trunk portion and the branch portions is less or greater than 45 degrees, and the predetermined angle is different in the first sub-pixel regions and the second sub-pixel regions, respectively;
   a liquid crystal layer formed between the first substrate and the second substrate, and the liquid crystal layer comprises reactive monomers and liquid crystal molecules;
   a first polarizer disposed at an outer side of the first substrate;
   a second polarizer disposed at an outer side of the second substrate; and
   a half wave (λ/2) pattern retarder film bonded on an outer surface of the first substrate or the second substrate, wherein the λ/2 pattern retarder film comprises a plurality of λ/2 retarder rows and a plurality of zero wave retarder rows, and the zero wave retarder rows are positioned to overlap the main pixel regions, and the λ/2 retarder rows are positioned to overlap the sub-pixel regions.

2. The liquid crystal display panel according to claim 1, wherein the sub-pixel regions further comprise third sub-pixel regions, and the predetermined angle in the third sub-pixel regions is different to the predetermined angles in the first sub-pixel regions and the second sub-pixel regions.

3. The liquid crystal display panel according to claim 2, wherein the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

4. The liquid crystal display panel according to claim 1, wherein the λ/2 pattern retarder film is positioned between the second substrate and the second polarizer.

5. The liquid crystal display panel according to claim 4, wherein the predetermined angle ($\theta_2$) is less than 45 degrees, and there is an included angle ($\Psi_1$) between slow axes of the λ/2 pattern retarder film and absorption axis of the second polarizer, and the predetermined angle ($\theta_2$) and the included angle ($\Psi_1$) satisfy the below equations:

$$\Psi_1+\theta_2=45°; \text{ and}$$

$$90-\theta_2>2\Psi_1.$$

6. The liquid crystal display panel according to claim 1, wherein the λ/2 pattern retarder film is positioned between the first substrate and the first polarizer.

7. The liquid crystal display panel according to claim 6, wherein the predetermined angle ($\theta_2$) is greater than 45 degrees, and there is an included angle ($\Psi_2$) between slow axes of the λ/2 pattern retarder film and absorption axis of the first polarizer, and the predetermined angle ($\theta_2$) and the included angle ($\Psi_1$) satisfy the below equations:

$$\Psi_2+\theta_2=135°; \text{ and}$$

$$2(90-\theta_2)>\Psi_2.$$

8. A liquid crystal display panel comprising:
   a first substrate comprising a first electrode;
   a second substrate comprising a second electrode and a plurality of pixels, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is 45 degrees in the main pixel region, and in each of the sub-pixel regions, a predetermined angle between the trunk portion and the branch portions is less or greater than 45 degrees;
   a liquid crystal layer formed between the first substrate and the second substrate;
   a first polarizer disposed at an outer side of the first substrate;
   a second polarizer disposed at an outer side of the second substrate; and
   a λ/2 pattern retarder film bonded on an outer surface of the first substrate or the second substrate, wherein the λ/2 pattern retarder film comprises a plurality of λ/2 retarder rows and a plurality of zero wave retarder rows, and the zero wave retarder rows are positioned to overlap the main pixel regions, and the λ/2 retarder rows are positioned to overlap the sub-pixel regions.

9. The liquid crystal display panel according to claim 8, wherein the sub-pixel regions comprise first sub-pixel regions and second sub-pixel regions, and the predetermined angle is different in the first sub-pixel regions and the second sub-pixel regions, respectively.

10. The liquid crystal display panel according to claim 9, wherein the sub-pixel regions further comprise third sub-pixel regions, and the predetermined angle in the third sub-pixel regions is different to the predetermined angles in the first sub-pixel regions and the second sub-pixel regions.

11. The liquid crystal display panel according to claim 10, wherein the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

12. The liquid crystal display panel according to claim 8, wherein the λ/2 pattern retarder film is positioned between the second substrate and the second polarizer.

13. The liquid crystal display panel according to claim 12, wherein the predetermined angle ($\theta_2$) is less than 45 degrees, and there is an included angle ($\Psi_1$) between slow axes of the $\lambda/2$ pattern retarder film and absorption axis of the second polarizer, and the predetermined angle ($\theta_2$) and the included angle ($\Psi_1$) satisfy the below equations:

$$\Psi_1 + \Psi_2 = 45°; \text{ and}$$

$$90 - \theta_2 > 2\Psi_1.$$

14. The liquid crystal display panel according to claim 8, wherein the $\lambda/2$ pattern retarder film is positioned between the first substrate and the first polarizer.

15. The liquid crystal display panel according to claim 14, wherein the predetermined angle ($\theta_2$) is greater than 45 degrees, and there is an included angle ($\Psi_2$) between slow axes of the $\lambda/2$ pattern retarder film and absorption axis of the first polarizer, and the predetermined angle ($\theta_2$) and the included angle ($\Psi_1$) satisfy the below equations:

$$\Psi_2 + \theta_2 = 135°; \text{ and}$$

$$2(90 - \theta_2) > \Psi_2.$$

16. A display apparatus comprising a backlight module and a liquid crystal display panel, wherein the liquid crystal display panel comprises:

a first substrate comprising a first electrode;

a second substrate comprising a second electrode and a plurality of pixels, wherein each of the pixels comprises a main pixel region and a sub-pixel region, and the second electrode has a pixel electrode structure, and the pixel electrode structure comprises a trunk portion and a plurality of branch portions, and an included angle between the trunk portion and the branch portions is 45 degrees in the main pixel region, and in each of the sub-pixel regions, a predetermined angle between the trunk portion and the branch portions is less or greater than 45 degrees;

a liquid crystal layer formed between the first substrate and the second substrate;

a first polarizer disposed at an outer side of the first substrate;

a second polarizer disposed at an outer side of the second substrate; and a $\lambda/2$ pattern retarder film bonded on an outer surface of the first substrate or the second substrate, wherein the $\lambda/2$ pattern retarder film comprises a plurality of $\lambda/2$ retarder rows and a plurality of zero wave retarder rows, and the zero wave retarder rows are positioned to overlap the main pixel regions, and the $\lambda/2$ retarder rows are positioned to overlap the sub-pixel regions.

17. The display apparatus according to claim 16, wherein the sub-pixel regions comprise first sub-pixel regions and second sub-pixel regions, and the predetermined angle is different in the first sub-pixel regions and the second sub-pixel regions, respectively.

18. The display apparatus according to claim 17, wherein the sub-pixel regions further comprise third sub-pixel regions, and the predetermined angle in the third sub-pixel regions is different to the predetermined angles in the first sub-pixel regions and the second sub-pixel regions.

19. The display apparatus according to claim 18, wherein the sub-pixel regions further comprise fourth sub-pixel regions, and the predetermined angle in the fourth sub-pixel regions is different to the predetermined angles in the first sub-pixel regions, the second sub-pixel regions and the third sub-pixel regions.

\* \* \* \* \*